United States Patent
Zang et al.

(10) Patent No.: US 8,463,237 B1
(45) Date of Patent: Jun. 11, 2013

(54) USING COMMUNICATIONS RECORDS TO DETECT UNAUTHORIZED USE OF TELECOMMUNICATION SERVICES

(75) Inventors: Hui Zang, Cupertino, CA (US); Travis E. Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 270 days.

(21) Appl. No.: 12/940,194

(22) Filed: Nov. 5, 2010

(51) Int. Cl.
*H04M 1/66* (2006.01)
*H04M 11/00* (2006.01)

(52) U.S. Cl.
USPC ........... 455/410; 455/405; 455/406; 455/407; 455/408

(58) Field of Classification Search
USPC .......................................... 455/405–408, 410
See application file for complete search history.

(56) References Cited

U.S. PATENT DOCUMENTS

| | | | | |
|---|---|---|---|---|
| 5,335,265 | A | * | 8/1994 | Cooper et al. ............... 455/410 |
| 5,950,121 | A | * | 9/1999 | Kaminsky et al. ........... 455/410 |
| 5,960,338 | A | * | 9/1999 | Foti .............................. 455/405 |
| 2004/0023637 | A1 | * | 2/2004 | Johnson et al. .............. 455/405 |

FOREIGN PATENT DOCUMENTS
EP     0981068     1/1999

OTHER PUBLICATIONS

Burge, Peter, et al., Detecting Cellular Fraud Using Adaptive Prototypes., Department of Computer Science, Royal Holloway University of London, England., 1997.
Burge, Peter, et al., Fraud Detection and Management in Mobile Telecommunications Networks., Royal Holloway University of London, England.
Fawcett, Tom, et al., Adaptive Fraud Detection, NYNEX Science and Technology, White Plains, NY., 1997.
Fawcett, Tom, et al., Activity Monitoring: Noticing interesting changed in behavior., Bell Atlantic Science and Technology, White Plains, NY., 1999.
Moreau, Yves, et al., A hybrid system for fraud detection in mobile communications., 1999.
Britos, Paola, et al., Unusual Changes of Consumption Detection in Mobile Phone Users, Software & Knowledge Engineering Center Graduate School, Buenos Aires Institute of Technology, 2006.
Gopal, Rupesh, K., et al., A Rule-based Approach for Anomaly Detection in Subscriber Usage Pattern, 2007.

* cited by examiner

*Primary Examiner* — Jean Gelin
*Assistant Examiner* — Dung Hong

(57) ABSTRACT

Subject matter described herein is directed to detecting fraud in a telecommunications environment. Communication records of a mobile device include attributes that describe communication instances of the device. For example, communication records might include a start time or end time of voice calls initiated by a mobile device. The attributes are analyzed, such as by calculating call-gap durations, to determine if any thresholds are violated. Threshold violations suggest fraudulent use and prompt an unauthorized-use response.

17 Claims, 3 Drawing Sheets

USING COMMUNICATIONS RECORDS TO DETECT UNAUTHORIZED USE OF TELECOMMUNICATION SERVICES

CROSS REFERENCE TO RELATED APPLICATIONS

This application is related by subject matter to another application identified by Ser. No. 12/940,215, which is titled "Using Communications Records to Detect Unauthorized Use of Telecommunication Services." The application identified by Ser. No. 12/940,215 is being filed on the same date as this application and is fully incorporated herein by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

At a high level, ways of detecting fraud in a telecommunications environment are provided. Communication records of a mobile device include attributes that describe communication instances of the device. For example, communication records might include a start time or end time of voice calls initiated by a mobile device. The attributes are analyzed to determine if any thresholds are violated. Threshold violations suggest fraudulent use and prompt an unauthorized-use response.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
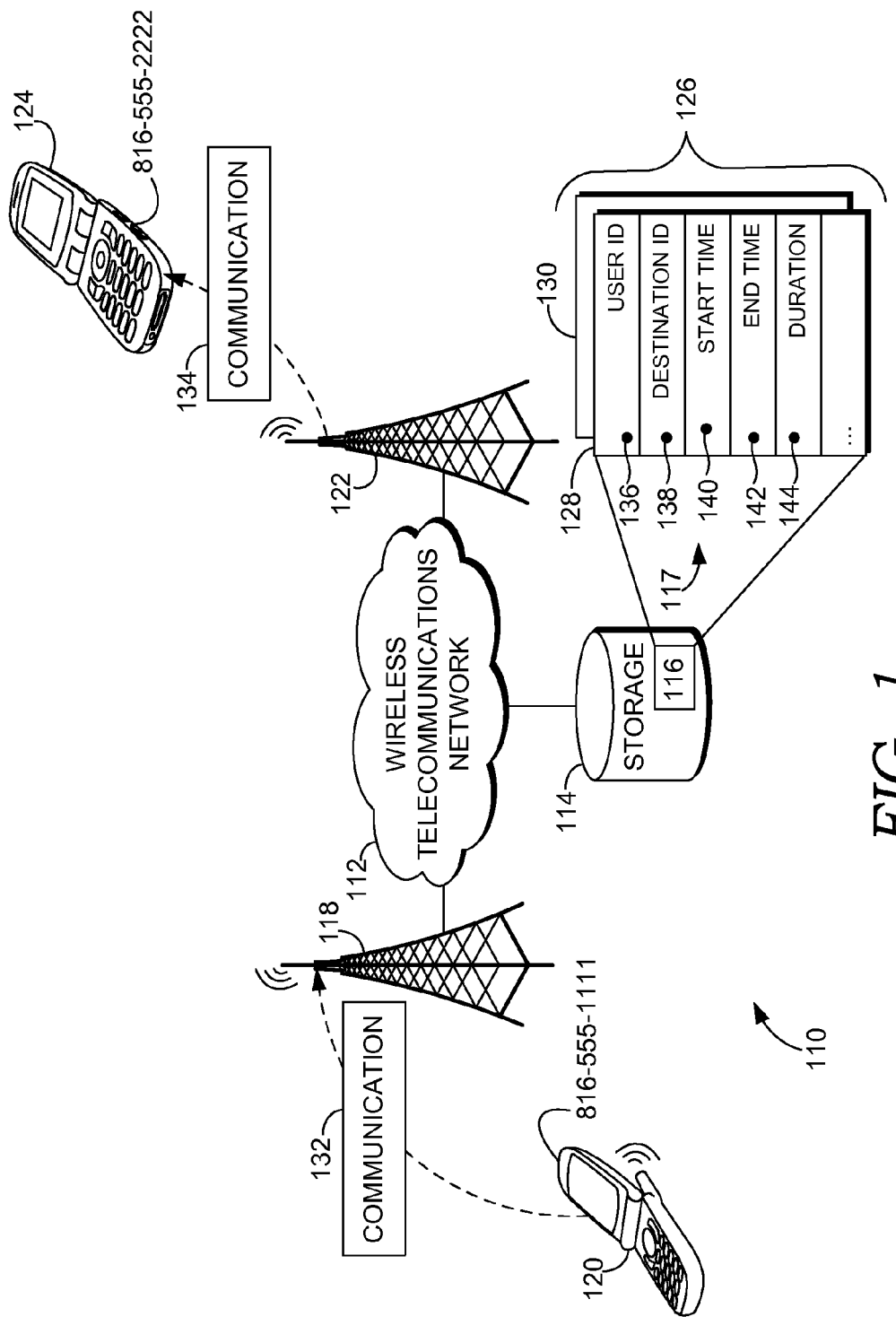
FIG. 1 depicts an exemplary operating environment in accordance with an embodiment of the present invention.

Referring now to FIG. 1, an exemplary operating environment suitable for practicing an embodiment of the technology is depicted and identified generally by reference numeral 110. Operating environment 110 includes a wireless telecommunications network 112. Wireless telecommunications network 112 is capable of communicating various technologies, such as CDMA, GPRS, TDMA, GSM, WiMAX, LTE, and the like.

Various components depicted in operating environment 110 communicate by way of wireless telecommunications network 112. One such component includes a first base transceiver station or tower 118. Base station 118 is capable of wirelessly communicating with a first mobile device 120. Similarly, a second base transceiver station or tower 122, which communicates with base station 118 by way of wireless communication network 112, can communicate with a second mobile device 124. Moreover, mobile devices 120 and 124 can communicate with one another using towers 118 and 122 and wireless communication network 112. For example, mobile device 120 might send an outgoing communication 132, such that mobile device 124 receives an incoming communication 134. Communication 132 might be sent in a variety of contexts. For example, mobile device 120 might initiate a voice call, send an instant message or a text message, send an email, or send a voicemail. Although FIG. 1 depicts a communication being exchanged between mobile devices 120 and 124, communication 132 might alternatively include a request by mobile device 120 to receive data (e.g., web content), the delivery of which is facilitated by network 112. Also, an event associated with sending communication 132 might be referred to herein as a communication instance or a communication session.

In one embodiment, wireless telecommunications network 112 is coupled to storage 114. Storage 114 includes information 116, which is depicted in an exploded view 117 for illustrative purposes. Exploded view 117 includes a set of communication records 126. Set 126 includes individual communication records 128 and 130 that include communication attributes (e.g., user id, destination id, start time, end time, duration, etc). Each record of communication information corresponds to a respective communication, such as communication 132. A respective communication corresponding to each record 128 and 130 might include various types of communication. For example, as previously indicated, a communication might include a voice call, instant message or a text message, an email, a voicemail, or a request for data services. Sometimes, communication information is referred to as Call Data Records (CDR).

For illustrative purposes, communication record 128 corresponds to communication 132. That is, record 128 is generated in response to communication 132 and includes various communication attributes that describe communication 132. Likewise, another communication record might be created to describe communication 134. In one embodiment of the present invention, communication record 128 includes a user identifier 136, which identifies a user, a mobile device, an account, or a combination thereof. That is, since device 120 engaged in communication 132 and record 128 is created to describe communication 132, user identifier 136 identifies device 120 or a user of device 120. User identifier 136 might also identify an account, which authorizes device 120 to utilize services of wireless telecommunications network 112.

Communication record 128 includes other fields that are associated with and that describe communication 132. For example, other fields include a destination identifier 138 corresponding to another endpoint of communication 132 (i.e., the destination of an outgoing call or the origination of an incoming call); a start time 140 representing a time instant at which communication 132 was initiated; an end time 142 representing a subsequent time instant at which communication 132 was terminated or completed; and a duration 144 of communication 132. These fields are exemplary and other embodiments might include more, fewer, or different fields in each communication record.

Figure 2:
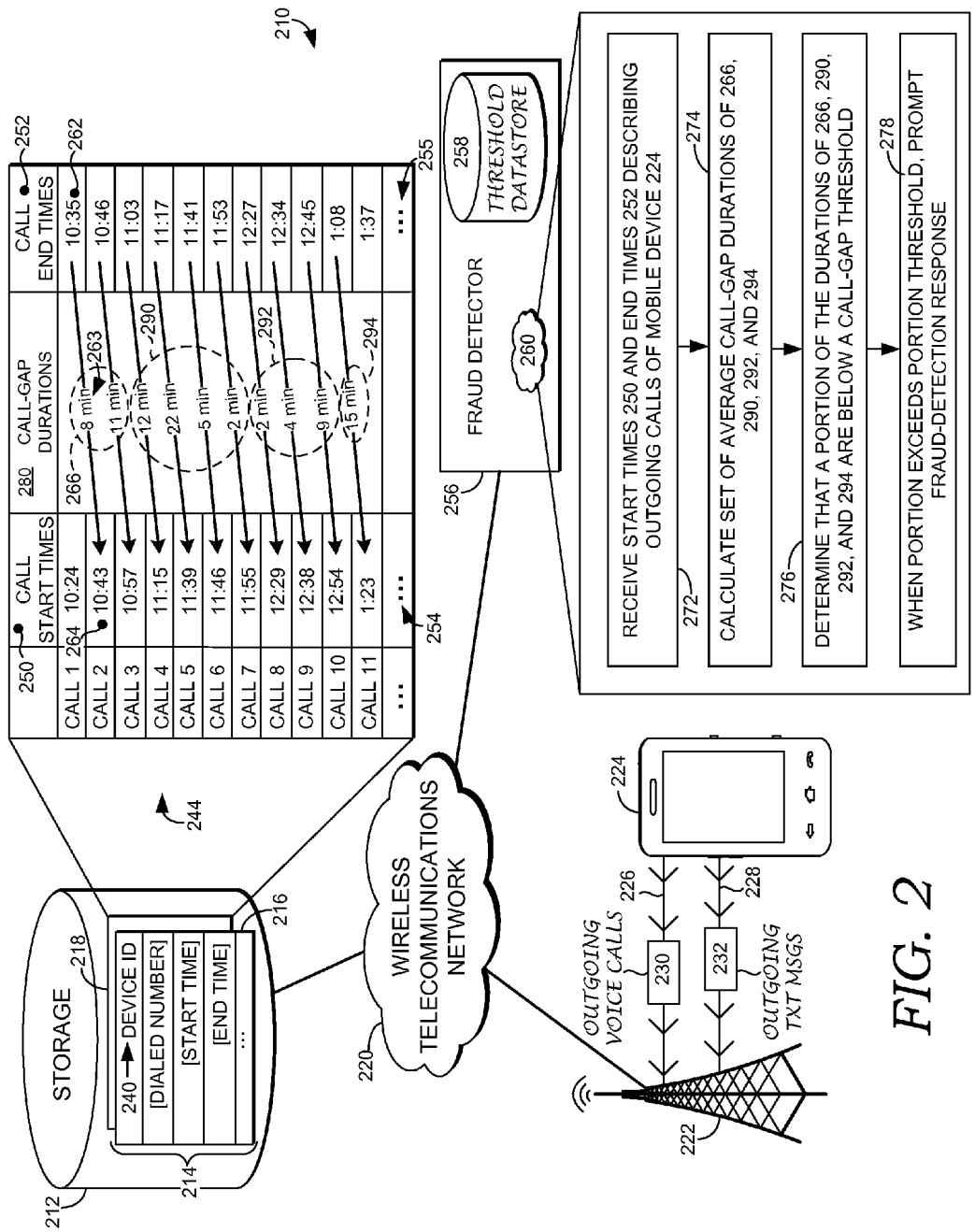
FIG. 2 depicts another exemplary operating environment in accordance with an embodiment of the present invention.

Referring now to FIG. 2, another exemplary operating environment suitable for practicing an embodiment of the technology is depicted and identified generally by reference numeral 210. Operating environment 210 includes subject matter that leverages communication records and the attributes included therein, such as set 126 and individual records 128 and 130 that were described with respect to FIG. 1. Communication records and attributes are also depicted in FIG. 2. For example, storage 212 includes a set 214 of communication records. Set 214 includes individual records 216 and 218. Although only two records 216 and 218 are depicted in FIG. 2, in other embodiments set 214 includes several (e.g., hundreds, thousands, etc.) additional records.

An embodiment of the invention is directed to analyzing information included in set 214 to detect fraudulent or unauthorized use of a mobile device. One example of fraudulent use includes establishing a telecommunications account with falsified information (e.g., fictitious name and/or stolen credit card). Such an account, which is established with falsified information, allows use of services provided by network 220. For example, an individual that set up the account with falsified information might charge other persons a fee to use a mobile device associated with the account. Charges that are applied to the account (e.g., monthly charges pursuant to a contract) are often not paid. Because the account was established with falsified information, a telecommunication-service provider might have little recourse to obtain payment for services rendered.

In some situations, an individual might set up multiple fraudulent accounts that are associated with a plurality of mobile devices. The mobile devices are provided to other persons that pay the individual in exchange for the individual allowing the other persons to use the mobile devices. These plurality of mobile devices are often used in a similar geographical location, thereby creating a locus of fraudulent activity. This locus might be referred to as a "call shop." Although a call shop often includes multiple devices associated with multiple accounts, embodiments of this invention are also applicable when an individual allows others to use a single mobile device, which is associated with one fraudulent account.

Components depicted in FIG. 2 communicate with one another in a manner similar to that described with respect to FIG. 1. That is, FIG. 2 includes a wireless telecommunications network 220, a tower 222, and a mobile device 224. These components might communicate under various circumstances, such as when mobile device 224 engages in a communication instance (e.g., voice call, text message, or data request).

Each line 226 and 228 connecting mobile device 224 to tower 222 represents a communication instance. For example, line 226 indicates that mobile device 224 is engaging in one or more communication instances 230, which include outgoing voice calls. Moreover, line 228 indicates that mobile device 224 is engaging in one or more communication instances 232, which include outgoing text messages. Communication instances 230 and 232 might take place at different instances in time across a time duration. An embodiment of the present invention is directed to determining whether mobile device 224 is being used in a fraudulent or unauthorized manner, such as in a call-shop environment.

When mobile device 224 engages in a communication instance (e.g., 230) a communication record is generated and maintained in storage 212. For example, record 216 includes a device id 240, which identifies mobile device 224. Accordingly, record 216 is generated when mobile device 224 engages in a communication instance. For explanatory purposes herein, set 214 includes records 216 and 218 that are generated by communication instances of mobile device 224. As previously indicated, although only two records 216 and 218 are depicted in FIG. 2, set 214 might include several (e.g., hundreds, thousands, etc.) more records, each of which describes a respective communication instance of mobile device 224.

Communication record 216 includes various instance attributes that describe a corresponding communication instance. For example, communication record 216 includes a device id, a dialed number, a start time, and an end time. Moreover, communication record 216 might include several other instance attributes that are not depicted, such as a start location, an end location, and a communication type (e.g., text message, incoming voice call, outgoing voice call, voice message, and data request).

For illustrative purposes, an exploded view 244 depicts information that is included among set 214. Exploded view 244 includes a set of start times 250 and a set of end times 252. Start times 250 indicate a time instant at which a communication was initiated by mobile device 224, and end times 252 indicate a time instant at which a communication ended. Time instances might be indicated with varying degrees of specificity. For example, a time instant might be indicated using any fraction of hours, minutes, and seconds. Exploded view 244 depicts start times 250 and end times 252 as hours and minutes. Although a limited quantity of start times and end times are depicted in exploded view 244, set 214 might include several additional start times and end times as indicated by ellipses 254 and 255.

Fraud detector 256 communicates with network 220 and includes a threshold datastore 258 and an application 260 embodied as a set of computer-executable instructions. That is, fraud detector 256 includes a set of embodied computer-executable instructions that facilitates various functional aspects of embodiments of the invention. For example, fraud detector 256 includes application 260 that is executed by fraud detector 256. Further, fraud detector 256 includes a computing device having components (e.g., processor and computer-readable media) that enable execution of application 260 and that enable fraud detector 256 to detect unauthorized use of telecommunication services.

In an embodiment, threshold datastore 258 includes a set of authorized-use parameters. An authorized-use parameter suggests an instance-attribute value that is common or typical among mobile devices that are used in a nonfraudulent manner or under the terms of legitimate account. For example, when a mobile device is legitimately used over a course of several hours or days, a certain amount of time (i.e., call-gap duration) typically passes on average between consecutive outgoing calls of the mobile device. Accordingly, a duration threshold (i.e., call-gap threshold) might be established to identify situations in which a relatively short amount of time is passing on average between a mobile device's consecutive outgoing calls. A mobile device being used in such a manner that call-gap durations are below a duration threshold suggests fraudulent activity (e.g., call shop). That is, in a call-shop environment, call-gap durations between consecutive calls are often relatively short because different customers of the call shop will initiate outgoing calls more rapidly than a single user.

In one embodiment of the present invention, a call-gap threshold is an adjustable threshold that might be set at various time durations, such as 20 minutes. A call-gap threshold might be determined using various methods. For example, a call-gap threshold might be heuristically determined. Alternatively a call-gap threshold might be determined by calculating a multi-user average call gap that averages call gaps across a plurality of users, such that the call-gap threshold is a number of standard deviations (e.g., at least two standard deviations) below the multi-user average call gap.

In one embodiment, individual call-gap durations between communication instances (e.g., outgoing voice calls) of a mobile device are determined and are compared to a call-gap threshold. For example, device 224 might engage in 20 communication instances, such that 19 individual call-gap durations are measured, each of which is compared to a call-gap threshold. In such a scenario, a finding that one of the call-gap durations is less than the call-gap threshold might suggest a fraudulent account.

An embodiment of the invention accounts for situations in which a mobile device registered under a legitimate account engages in some communication instances that have call gaps below the call-gap threshold. For example, a portion threshold might be established, such that possible fraudulent activity is detected when a portion (e.g., 20%) of the call-gap durations do not exceed the call-gap threshold. Continuing with the above example, if a portion threshold were set at 20%, then fraudulent activity would be detected if four or more of the 19 call-gap durations were below the call-gap threshold.

Another embodiment of the invention accounts for situations in which a mobile registered under a legitimate account engages in communication instances that have call gaps below the call-gap threshold, but that are relatively spaced out throughout a period of time (e.g., a 24-hour period). For example, an average-call-gap duration of a period of time (e.g., over an hour or a day) might be determined, such that the average-call-gap duration can be compared to the call-gap threshold. Accordingly, a determination that the average-call-gap duration is less than the call-gap threshold might be used to suggest fraudulent activity. An "average" might be calculated by applying various techniques, such as by finding a simple average or by calculating a running average.

Another embodiment takes into consideration circumstances in which legitimate users (e.g., users that have established a legitimate account) initiate outgoing calls frequently enough to generate average-call-gap durations that are less than the call-gap threshold. For example, over the course of a couple of hours in a 24-hour period, a legitimate user might generate average-call-gap durations (e.g., average in the course of an hour) that are less than the call-gap threshold. As such, an embodiment of the present invention determines a plurality of average-call-gap durations over the course of a period of time (e.g., one day or one week), such that fraudulent activity is suggested when a portion of the plurality (e.g., 4 hours out of a 24-hour period or 3 days out of a 7-day period) are below the call-gap threshold. In one embodiment, a portion threshold is established, such that fraudulent activity is suggested when the portion of the plurality exceeds the portion threshold. For example, a portion threshold might be set at four hours, such that when four or more hours of a 24-hour period experience average-call-gap durations that are below the call-gap threshold, fraudulent activity is suggested.

Fraud detector 256 analyzes attributes in set 214 that are associated with mobile device 224. For example, fraud detector 256 might analyze attributes that are collected during a time period, such as a day, a week, or a month. By analyzing attributes in set 214, fraud detector 256 can quantify characteristics of mobile device 224 to be compared against thresholds stored in threshold data store 258. In embodiments of the present invention, fraud detector might analyze attributes either offline or in real time.

In one embodiment, fraud detector 256 utilizes set 214 to assess how quickly mobile device 224 initiates new subsequent outgoing call after a call is terminated. That is, fraud detector 256 calculates an instance-gap duration (e.g., call-gap duration), which includes a duration of time that elapses between consecutive outgoing calls initiated by mobile device 224. For example, fraud detector 256 calculates a duration of time (e.g., 8 min) that passes between an end time (e.g., 262) of an outgoing call and a start time (e.g., 264) of a consecutive ensuing outgoing call. A column 280 is depicted as part of exploded view 244 to list a set of call-gap durations between consecutive calls.

In addition to calculating instance-gap durations between consecutive calls, fraud detector might also determine an average call-gap duration over a time period. For example, circle 266 groups multiple call-gap durations that occur in a time period between 10:00 and 11:00 over which an average call-gap duration might be calculated. That is, the average call-gap duration of the gaps (e.g., 8 minutes and 11 minutes) occurring between 10:00 and 11:00 is 9 minutes and 30 seconds. Average-call-gap durations might suggest whether a mobile device is being used in a legitimate manner. For example, if call records of mobile device 224 yield multiple average-call-gap durations below a threshold, such analysis might suggest that a mobile device is being used in a call-shop environment. Although FIG. 2 depicts that average-call-gap durations might be determined for each hour, other embodiments of the invention determine average-call-gap durations for a variety of other time fractions, such as an average of a 30-minute period, an average over the course of a week, and the average over the course of a month.

In other embodiments, fraud detector 256 determines that a threshold number of communication instances have been experienced by device 224 before undergoing further fraud-detection analysis. For example, a threshold number of communication instances includes five outgoing calls in a 24-hour period, such that if mobile device 224 has experienced fewer than five outgoing calls in a 24-hour period, fraud detector will not undergo fraud analysis of communication records 214.

An embodiment of the present invention includes a set of embodied computer-executable instructions that facilitates various aspects of the invention. Furthermore, illustrative operating environments 110 and 210, which are described above, are usable to facilitate a method of detecting unauthorized use of telecommunication services that are attributable to an account. That is, communication records associated with an account can be tracked by network 220 and analyzed by fraud detector 256 in a manner that enables network 220 (or fraud detector 256) to deem when fraudulent activity might have occurred. Communication records might be tracked over a course of an interval (e.g., day, week, or month) and analysis executed at the end of the interval to determine if fraudulent activity is occurring.

As described above, analysis might include comparing an instance-gap duration or average-instance-gap duration to a relevant threshold. A call-gap duration is a type of instance-gap duration described throughout this description; however, an embodiment of the present invention might analyze gaps between other types of communication instances, such as sending text messages or sending data requests. In other embodiments of the invention, types of voice calls might be targeted when conducting fraud-detecting analysis. For example, the analysis might consider outgoing voice calls, international outgoing voice calls, outgoing voice calls to North American Numbering Plan numbers, outgoing voice calls to suspicious area codes/numbers (i.e., area codes or numbers that are frequently dialed from a call-shop environment), or a combination thereof.

Figure 3:
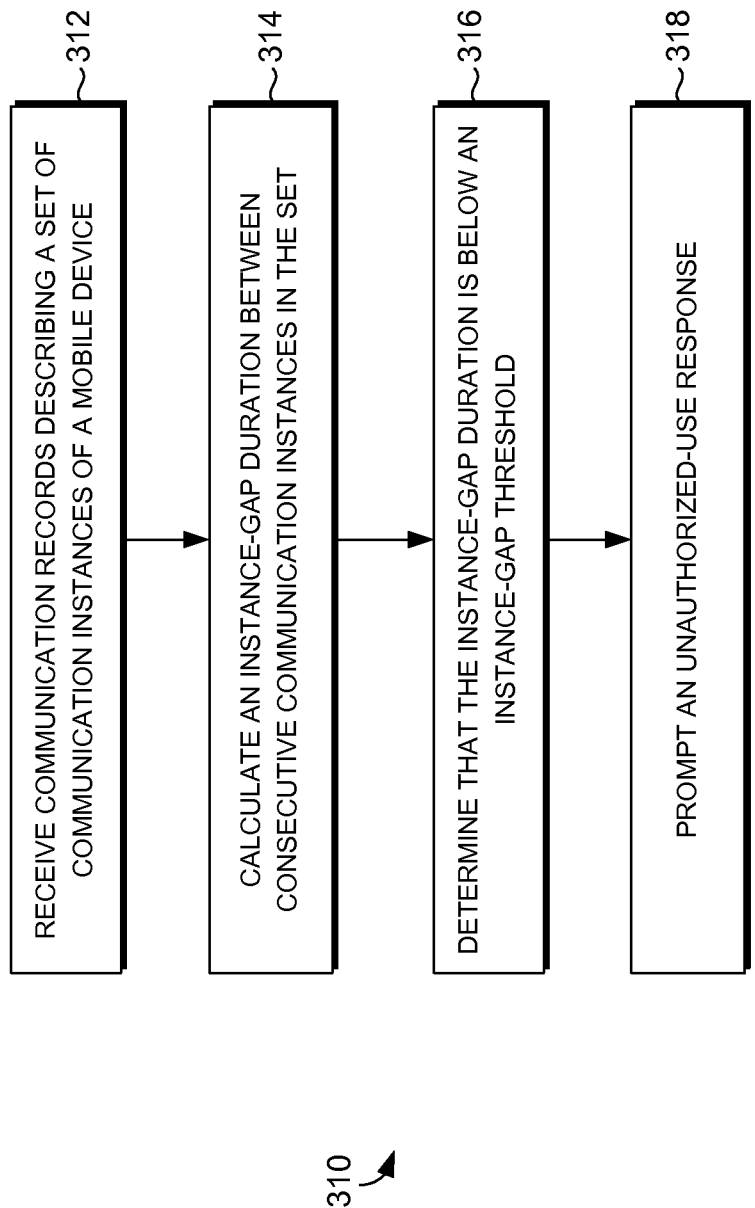
FIG. 3 depicts a flow diagram in accordance with an embodiment of the present invention.

Now referenced is FIG. 3, which depicts an exemplary method 310 of detecting mobile-device-account fraud. In describing FIG. 3, reference will also be made to FIG. 2. Method 310 includes at step 312 receiving communication records (e.g., time instants of set 214) describing a set of communication instances of a mobile device (e.g. 224). For example, fraud detector 256 might receive time instants 250 and 252 that describe outgoing voice calls of mobile device 224.

Step 314 includes calculating an instance-gap duration between consecutive communication instances in the set of communication instances. As described previously, an instance-gap duration includes a duration of time that passes between a time instant of a communication instance and a subsequent time instant of a consecutive ensuing communication instance. For example, instance-gap duration 263 might be calculated. Moreover, an average-instance-gap duration might be analyzed, instead of individual instance-gap durations to account for legitimate users occasionally quickly initiating consecutive outgoing calls. For example, an average-instance-gap duration might be calculated for each of groupings 266, 290, 292, and 294.

Step 316 includes determining that the instance-gap duration is below an instance-gap threshold. For example, the instance-gap threshold might be retrieved from threshold datastore 258, and as described above, an exemplary instance-gap threshold is set at 20 minutes. Accordingly, step 316 might include determining that instance-gap duration 263 is below an instance-gap threshold (e.g., 20-minute threshold. A further embodiment includes determining that the average-instance-gap duration (9 minutes 30 seconds) of grouping 266 is below a 20-minute threshold. Step 318 includes, when the instance-gap duration (or average-instance-gap duration) is below the instance-gap threshold, prompting an unauthorized-use response.

Returning to FIG. 2, fraud detector 256 executes a method 270 that utilizes elements of FIG. 2, such as start times 250 and end times 252. At step 272, fraud detector 256 receives start times 250 and end times 252 describing outgoing calls of mobile device 224. Moreover, step 274 includes calculating a set of average call-gap durations of circles 266, 290, 292 and 294. Circles 266, 290, 292, and 294 each group a respective set of call-gap durations that occur within a respective time fraction (e.g., one hour) of a given time period (e.g., a 24-hour period). Accordingly, an average-call-gap duration of circle 266 is 9 minutes 30 seconds; an average-call-gap duration of circle 290 is 10 minutes 15 seconds; an average-call-gap duration of circle 292 is 5 minutes; and an average-call-gap duration of circle 294 is 15 minutes.

Step 276 of method 270 includes determining that a portion of the durations of 266, 290, 292, and 294 include average-call-gap durations below a call-gap threshold. If a call-gap threshold were set at 20 minutes, all of groupings 266, 290, 292, and 294 would include average-call-gap thresholds below the call-gap threshold. At step 278, when the portion exceeds a portion threshold, an unauthorized-use response is prompted. In this case, a portion threshold might be set at 4 hours within a 24-hour period, such that, when groupings 266, 290, 292, and 294 include average-call-gap durations below the call-gap threshold (e.g., 20 minutes), the portion threshold is met, thereby suggesting fraudulent activity.

An unauthorized-use response (i.e., fraud-detection response), which is triggered when fraudulent activity is detected, might include various actions. For example, a fraud-detection response might include flagging an account associated with the mobile device, sending a notification to a notification recipient, and/or terminating services provided to the mobile device. Moreover, a fraud-detection response might include clustering locations of the mobile device with locations of a set of mobile devices that share a geographical relationship. Once a cluster has been determined, an approximate centroid of the cluster can be used to suggest a likely geographical location of fraudulent activity.

In an embodiment of the present invention, detecting when a use might be unauthorized triggers various desired actions. For example, an account might be flagged to indicate a possible unauthorized use. In addition, services of an account might be frozen or terminated altogether. Further, an alarm (e.g., visual indicator) might be triggered that notifies an alarm recipient of the possible unauthorized use.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. Non-transitory computer-readable media storing computer-executable instructions that, when executed, perform a method of detecting mobile-device-account fraud, the method comprising:

receiving communication records describing a set of communication instances of a mobile device, wherein each communication record includes a respective time instant;

calculating an average instance-gap duration between consecutive communication instances in the set of communication instances, wherein an instance-gap duration includes a duration of time that passes between a time instant of a communication instance and a subsequent time instant of a consecutive ensuing communication instance; and prompting an unauthorized-use response based on the average instance-gap duration being below an instance-gap threshold, wherein the instance-gap threshold is determined by calculating a multi-user average instance-gap duration that averages instance-gap durations across a plurality of users and wherein the instance-gap threshold is a number of standard deviations below the multi-user average instance-gap duration.

2. The computer-readable media of claim 1, wherein the set of communication instances includes outgoing voice calls initiated by the mobile device.

3. The computer-readable media of claim 2, wherein outgoing voice calls of the set include international outgoing calls initiated by the mobile device.

4. The computer-readable media of claim 2, wherein voice calls of the set include outgoing voice calls to one or more suspicious area codes, which historically are called when mobile-device-account fraud is being perpetuated.

5. The computer-readable media of claim 1, wherein the unauthorized-use response includes deeming the mobile device a call-shop mobile device that is used to perpetuate the mobile-device-account fraud.

6. The computer-readable media of claim 1, wherein an unauthorized-use response includes flagging an account associated with the mobile device.

7. The computer-readable media of claim 1, wherein an unauthorized-use response includes terminating services provided to the mobile device.

8. Non-transitory computer-readable media storing computer-executable instructions that, when executed, perform a method of detecting mobile-device-account fraud, the method comprising:
receiving communication records describing a set of communication instances of a mobile device, wherein the each communication record includes a respective time instant;
calculating a set of instance-gap durations, wherein an instance-gap duration includes a duration of time that passes between an end time of a communication instance and a start time of a consecutive ensuing communication instance;
determining that a portion of the set of instance-gap durations includes durations that are below an instance-gap threshold, wherein the instance-gap threshold is determined by calculating a multi-user average instance-gap duration that averages instance-gap durations across a plurality of users and wherein the instance-gap threshold is a number of standard deviations below the multi-user average instance-gap duration; and
prompting an unauthorized-use response when the portion exceeds a portion threshold.

9. The computer-readable media of claim 8 further comprising, calculating a set of average-instance-gap durations.

10. The computer-readable media of claim 9, wherein determining that the portion includes durations below the instance-gap threshold includes determining that a portion of the set of average instance-gap durations includes average-instance-gap durations below the instance-gap threshold.

11. The computer-readable media of claim 10, wherein the unauthorized-use response is prompted when the portion of the set of average instance-gap durations exceeds the portion threshold.

12. The computer-readable media of claim 8, wherein the unauthorized-use response includes deeming the mobile device a call-shop mobile device that is used to perpetuate the mobile-device-account fraud.

13. Non-transitory computer-readable media storing computer-executable instructions that, when executed, perform a method of detecting mobile-device-account fraud, the method comprising:
receiving communication records describing a set of outgoing voice calls of a mobile device, wherein each communication record includes a respective call-start time and a respective call-end time;
using the communication records to calculate an average call-gap duration of the set, wherein a call-gap duration includes a duration of time that passes between an end time of a voice call and a start time of a consecutive ensuing voice call; and
prompting an unauthorized-use response based on the average being below a call-gap threshold, wherein the call-gap threshold is determined by calculating a multi-user average call-gap duration that averages call-gap durations across a plurality of users and wherein the call-gap threshold is a number of standard deviations below the multi-user average call-clap duration.

14. The computer-readable media of claim 13, wherein the average is a simple average.

15. The computer-readable media of claim 14, wherein the unauthorized-use response includes deeming the mobile device a call-shop mobile device that is used to perpetuate the mobile-device-account fraud.

16. The computer-readable media of claim 14, wherein the unauthorized-use response includes flagging an account associated with the mobile device.

17. The computer-readable media of claim 13, wherein the average is a moving average.

* * * * *